US012659744B2

(12) United States Patent
Balmakhtar et al.

(10) Patent No.: US 12,659,744 B2
(45) Date of Patent: Jun. 16, 2026

(54) POLICY MEDIATION AND DELIVERY TO ENFORCEMENT POINTS IN WIRELESS COMMUNICATION NETWORKS

(71) Applicant: T-MOBILE INNOVATIONS LLC, Overland Park, KS (US)

(72) Inventors: Marouane Balmakhtar, Fairfax, VA (US); Serge M. Manning, Plano, TX (US); Gregory David Schumacher, Holliston, MA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 569 days.

(21) Appl. No.: 18/150,331

(22) Filed: Jan. 5, 2023

(65) Prior Publication Data

US 2024/0236678 A1    Jul. 11, 2024

(51) Int. Cl.
*H04W 12/08* (2021.01)
(52) U.S. Cl.
CPC .................................... *H04W 12/08* (2013.01)
(58) Field of Classification Search
CPC .............................. H04W 12/06; Y02D 30/70
See application file for complete search history.

(56) References Cited

U.S. PATENT DOCUMENTS

| | | | |
|---|---|---|---|
| 7,703,126 B2 | 4/2010 | Khosravi et al. | |
| 8,041,825 B2 | 10/2011 | Gibbs et al. | |
| 8,521,775 B1 | 8/2013 | Poh et al. | |
| 8,606,738 B2 | 12/2013 | Van Elburg et al. | |
| 9,054,971 B2 | 6/2015 | Kumar et al. | |
| 9,178,807 B1 | 11/2015 | Chua et al. | |
| 9,660,818 B2 | 5/2017 | Castro Castro et al. | |
| 10,425,238 B2 | 9/2019 | Poh et al. | |
| 10,601,875 B2 | 3/2020 | Goldschlag et al. | |
| 10,721,275 B2 | 7/2020 | Kung et al. | |
| 11,540,112 B1 | 12/2022 | Bertz et al. | |
| 2007/0180490 A1* | 8/2007 | Renzi ................... G06F 21/604 |
| | | | 726/1 |
| 2012/0099430 A1* | 4/2012 | Vos ................... H04W 28/0236 |
| | | | 370/235 |
| 2012/0120828 A1* | 5/2012 | Anderson ............. H04W 76/28 |
| | | | 370/252 |
| 2015/0222710 A1* | 8/2015 | Liu ..................... H04L 41/0893 |
| | | | 709/228 |
| 2018/0115470 A1* | 4/2018 | Huang .................. H04W 28/24 |
| 2018/0324061 A1* | 11/2018 | Khanal ................ H04L 43/028 |
| 2024/0080923 A1* | 3/2024 | Qiao ..................... H04W 76/12 |

* cited by examiner

*Primary Examiner* — Fabricio R Murillo Garcia

(57) ABSTRACT

Technology including systems, methods, and devices is disclosed herein to operate a wireless communication system to serve a wireless communication device based on policies. In an implementation, a method of operating a wireless communication system includes receiving policies for a wireless device from multiple policy sources. The method includes correlating policies to layers of a protocol and selecting ones of the policies for ones of the layers based on the correlations. The method further includes indicating the selected ones of the policies to one or more enforcement points.

20 Claims, 12 Drawing Sheets

400

RECEIVE POLICIES FOR USER DEVICE FROM MULTIPLE PDPS
201

CORRELATE POLICIES FOR USER DEVICE TO OSI LAYERS
202

SELECT ONES OF THE POLICIES FOR ONES OF THE OSI LAYERS BASED ON CORRELATIONS
203

INDICATE SELECTED ONES OF THE POLICIES FOR USER DEVICE TO PEP
204

200

1200

COMPUTING SYSTEM 1201

STORAGE SYSTEM 1203

SOFTWARE 1205

POLICY MEDIATION PROCESS 1206

COMM I/F SYSTEM 1207

PROCESSING SYSTEM 1202

USER I/F SYSTEM 1209

POLICY MEDIATION AND DELIVERY TO ENFORCEMENT POINTS IN WIRELESS COMMUNICATION NETWORKS

TECHNICAL FIELD

Aspects of the disclosure are related to wireless communication networks, particularly access control policies.

BACKGROUND

Fifth-generation (5G) communication networks rely on security policy frameworks to allow authorized access to network resources (e.g., data, devices, or services). The logical components of a policy framework include a policy decision point (PDP) and a policy enforcement point (PEP). When a user, device or service requests access to a network resource, the PEP protects the network resource by controlling access to it. To control access, the PEP relies on access control decisions made by the PDP. The PDP evaluates the request for access according to the security policies to determine whether access is authorized.

In a policy framework, the security policies are organized to control access according to the level of protection required for the resource, privileges of the requester, and environmental conditions that can change the allowed behavior of the requester with respect to the resource. The PDP evaluates the parameters of the request against the security policies to determine whether the requester should be allowed access to the resource, then transmits the authorization decision to the PEP to implement that decision (e.g., allow or deny access).

In a service-based architecture, various aspects of the security policy framework are implemented in a number of network functions. For example, the PEP function may be performed by a User-Plane Function (UPF), and the PDP may be embodied in multiple network functions, such as the UDM (Unified Data Management), the PCF (Policy Control Function), the AMF (Access and Mobility Function), the SMF (Session Management Function), and so on. For example, broadly speaking, the UDM validates the identity of the requester and authorizes access, while the PCF provides policy rules for control and data plane functions (e.g., network slicing, QoS (Quality of Service), roaming, and mobility restrictions).

When a user device in a zero-trust environment requests access to a network resource, such as an enterprise application server, the end-to-end access path may traverse multiple network security domains controlled by different entities, such as a mobile network operator (MNO) and the enterprise operating the server. In traversing the multiple domains, the access path may pass through a PEP shared by the multiple security domains. The shared PEP is controlled by PDPs of the multiple security domains. Each security domain may have its own security policies for authorizing access. These policies may vary according to the entity (e.g., with respect to requester privileges granted by the entity) but also with respect to traffic granularity and to the layers of the Open Systems Interconnection model (OSI) protocol stack for managing network communication, as well as other parameters.

Because the security policies are independently defined and enforced in a zero-trust environment, an access request may result in conflicting authorization decisions by the multiple PDPs. For example, a request from a client device of a Mobile Virtual Network Operator (MVNO) may require authorization from not only the MVNO but also from the MNO operating the communication network, as well as the enterprise operating the resource targeted by the request. While the MVNO may permit the client device a certain amount of bandwidth or throughput on the network, the MNO may impose restrictions on the bandwidth, for example, during periods of high-volume traffic on the network. Alternatively, the MNO may restrict particular transaction types or access to particular applications.

TECHNICAL OVERVIEW

Technology, including systems, methods, and devices, is disclosed herein to operate a wireless communication system to serve a wireless communication device based on policies. In an implementation, a method of operating a wireless communication system includes receiving policies for a wireless communication device from multiple policy sources having authority to control traffic associated with the wireless device. The method includes correlating the policies to layers of a protocol of the wireless communication system. The layers of the protocol support the traffic associated with the wireless device. The method includes selecting ones of the policies for ones of the layers based on the correlations and indicating the selected ones of the policies to one or more enforcement points.

In some implementations, the multiple policy sources include Policy Decision Points (PDPs), and the one or more enforcement points include Policy Enforcement Points (PEPs). In some implementations, the layers of the protocol include layers of the OSI model.

DETAILED DESCRIPTION

Figure 1:
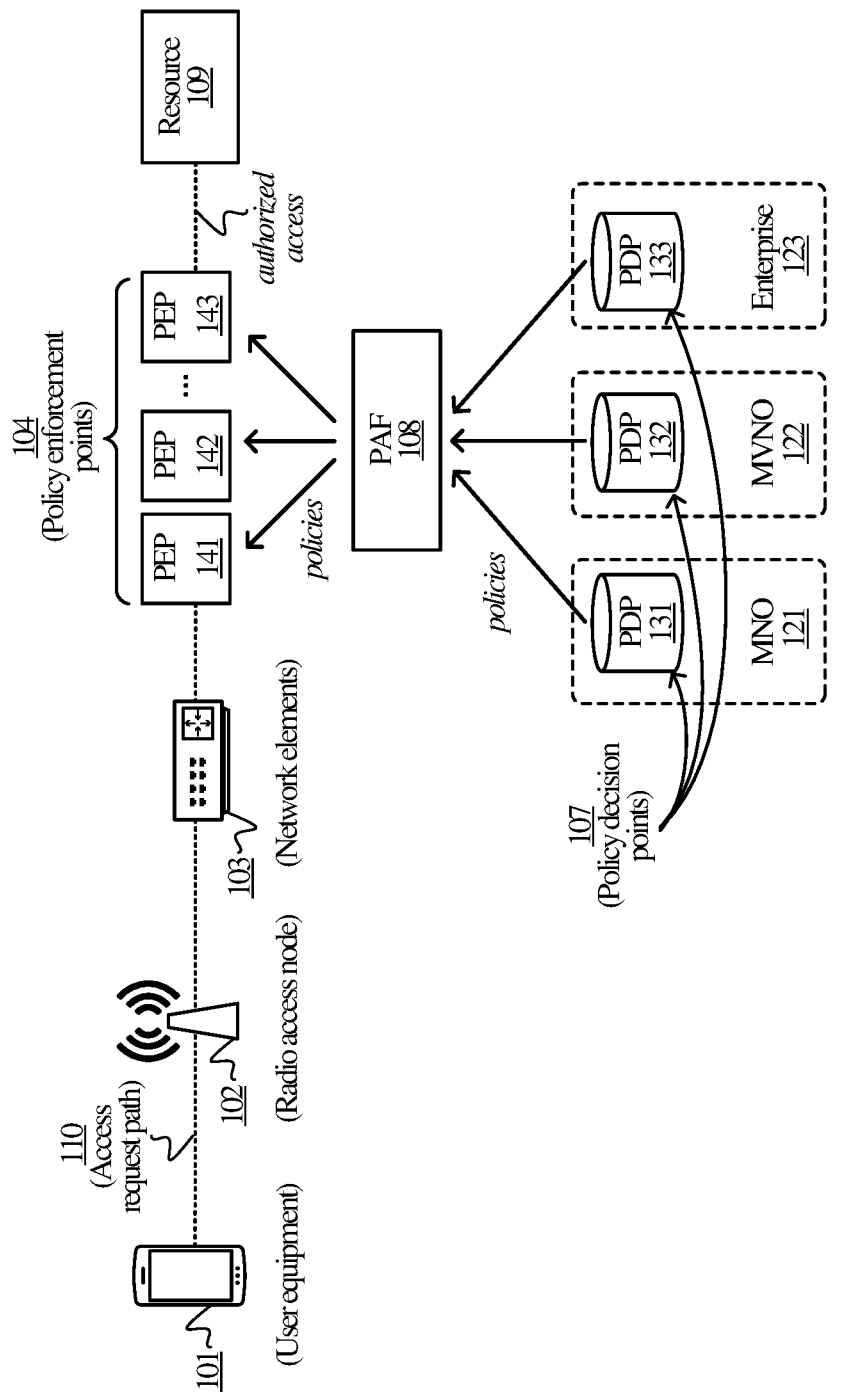
FIG. 1 illustrates an exemplary wireless communication system that serves a wireless communication device based on policies.

Systems, methods, and devices are disclosed herein to operate a wireless communication system to serve wireless communication devices based on security policies. In an implementation, a user device requests access to a resource via a wireless communication network. The access request is received by the communication system. The communication system receives policies for the wireless device from multiple policy sources which have the authority to control traffic associated with the wireless device. The communication system correlates the policies to layers of a protocol which support the traffic associated with the wireless device and selects ones of the policies for each of the protocol layers based on the correlations. The communication system then indicates the selected policies to one or more enforcement points. Upon receiving the selected policies, the enforcement points implement the policies with respect to the request for access.

In an implementation, when a mobile device (e.g., a smartphone) requests access to an endpoint, such as an enterprise server or other resource, the path of the request may traverse multiple network security domains to reach the endpoint. The security domains may be operated by various entities, such as mobile network operators (MNOs), mobile virtual network operators (MVNOs), and enterprises. In a zero-trust environment, each security domain has its own set of security policies for authorizing access to network resources.

When the request from the mobile device encounters a security domain, it seeks permission to use the network from a PEP for that security domain. The PEP receives the request and configures an authorization request based on parameters such as the user's attributes, the resource it wishes to access, and the action they are attempting to take on that resource. The PEP sends the authorization request to a PDP which evaluates the authorization request according to the policy set for the security domain and returns a decision to the PEP about whether or what type of access is authorized. The decision may be to permit access, to deny access, that the request is inapplicable, or that the request is indeterminate (e.g., due to insufficient information in the request). The PEP then implements that decision.

In some situations, two or more security domains may share a PEP. For example, an MNO and an enterprise customer of the MNO may share a single PEP which enforces policies for both entities, with non-overlapping control layers distributed or assigned to each entity. In other implementations, the MNO may host a PEP on behalf of the enterprise. The hosted PEP may be controlled exclusively by the enterprise, or control may be shared by both entities, each providing a security policy set.

When a request encounters a PEP shared by two or more security domains, the PDP for each security domain may use a policy set independently defined for that domain. As such, the policies by which each PDP makes an authorization decision may be different: the policies may be in direct conflict, one policy may be more restrictive than the other, one PDP may have a policy while the other does not, and so on. Security policies may be defined by according to the levels of an interconnect model, such as the Open Systems Interconnection (OSI) protocol stack, traffic granularity, transaction type, application type, applicable network slice, an access schedule, user device subscription (e.g., 5G mobile subscription, subscription comprising various characteristics or policies regarding mobile data consumption, overages, etc.), and so on. For example, the control-plane policy of one PDP may conflict with another PDP's policy for certain classes of IP addresses.

To make an authorization decision for an authorization request where multiple security domains control access to the network, the various policies of the security domains are reconciled by a Policy Application Function (PAF) which mediates conflicting policy decisions of multiple PDPs. The PEP transmits an authorization request to a PAF which receives the security policies or policy decisions of each PDP of each security domain controlling the PEP. The PAF includes one or more rules to reconcile multiple conflicting policies. The policy reconciliation is applied to the authorization request, and the resulting authorization decision is passed back to the PEP.

In some implementations, the PAF receives a policy for deciding an authorization request, and the PAF applies the policy to determine an authorization decision according to parameters of the access request, network conditions, and other factors. In the same or other implementations, receiving a policy includes receiving a decision resulting from a policy as the PDP has applied it to the parameters of the request. The PAF receives a policy decision made by a PDP regarding authorization based on the access request parameters, network conditions, and other factors. In still other implementations, the PAF receives the authorization decision as well as the policy.

Authorization decisions are made based on policies defined according to a protocol, traffic granularity, network slices, transaction type, application type, access scheduling (e.g., time-of-day usage rules), user device subscription, and so on. An interconnect model provides a framework for standardizing network communication by abstracting communication in terms of layers of operation. In an implementation, the policies are defined according to layers of the Open Systems Interconnection (OSI) model. The OSI model is a seven-layer protocol stack for network communication including, from lowest to highest level of abstraction, the physical layer, the data link layer, the network layer, the transport layer, the session layer, the presentation layer, and the application layer. In other implementations, policies are defined according to other protocols, such as the Internet Protocol (IP), Transmission Control Protocol (TCP), or User Datagram Protocol (UDP). Policies may also be defined by layer-specific protocols. For example, the application layer of the OSI model may include the HTTP protocol, the FTP protocol, and so on. Thus, the policies defined according to the layers of a protocol stack control a particular aspect or functionality of network communication by the user device.

Traffic granularity refers to classifying network data traffic by the level of detail of the classes. For example, moving from coarse to fine (or broad to narrow) classifications, network data traffic can be classified according to MAC addresses, IP addresses, IP flow, TCP connections, and ports. Policies for controlling access by network traffic can be defined in terms of traffic granularity classifications.

An advantage afforded by 5GNR communication networks over earlier network types is the ability to optimize the distribution of network resources via network slicing. Network slicing optimizes network resource usage by allocating network resources and defining operational rules or policies according to a particular application, need, or purpose. In network slicing, the resources of a physical communication network are logically organized into multiple, virtualized networks, each of which provides a unique set of operating characteristics to meet the particular requirements (e.g., performance characteristics) of a given purpose. For example, a network slice may be defined to provide high download speed with moderate latency (e.g., for video streaming), while another network slice may provide high reliability and very low latency with low throughput (e.g., for autonomous vehicle operation), while still another may support high mobility and scalable control (e.g., for enhanced mobile broadband services). For each network slice, policies for controlling network resource usage may be defined for the control plane, the data or user plane, and, in some implementations, a management layer.

In an implementation, the PAF resolves conflicts between the policies or policy decisions of multiple PDPs and coordinates a resulting action to satisfy the security policies of all the affected security domains. For example, if there are multiple similar policies but defined for different traffic granularities, the mediation function or PAF operates according to the most restrictive policy. For another example, if different policies apply to different points in the protocol stack, the mediation function may selectively implement policies by OSI layer, such as permitting all packets at the IP flow level and below but blocking one particular application transaction type or blocking a particular application in its entirety but allowing the session to continue. Finally, if there is no conflict detected between multiple applicable policies, the PAF takes no action or simply applies the policies as provided by the PDPs.

For yet another example, if one PDP decides to re-assess the authorization decision (after the mediation function has made and stored an authorization decision), the mediation function may maintain the authorization states of the PDPs but re-mediate according to the new authorization decision and the stored authorization decision.

Turning now to the Figures, FIG. 1 illustrates an exemplary wireless communication system 100 servicing user equipment (UE) 101. Wireless communication system 100 includes UE 101, radio access network (RAN) 102, one or more network elements 103, PEPs 104 (which includes PEP 141, PEP 142, and PEP 143), PAF 108, PDPs 107 (which includes PDP 131, PDP 132, and PDP 133 of exemplary entities MNO 121, MVNO 122, and enterprise 123, respectively), and resource 109. Wireless communication system 100 delivers wireless data services to UE 101 such as Internet access, machine control, data collection, content streaming, media conferencing, and/or other wireless data products.

User equipment 101 is representative of smartphones, computers, sensors, controllers, and/or some other user apparatus with processing circuitry for wireless communication. UE 101 exchanges wireless communication signals with RAN 102 over radio frequency bands. RAN 102 is representative of equipment using radio frequencies to provide wireless connectivity to devices, such as Fifth Generation (5G) RANs, long-term evolution (LTE) RANs, geodes, eNodeBs, NB-IoT access nodes, LP-WAN base stations, wireless relays, Wifi access nodes, Wifi hotspots, ENET access nodes, Bluetooth access nodes, and/or other wireless or wireline network transceivers.

UE 101 and RAN 102 are representative of wireless communication devices or radios which wirelessly communicate using protocols such as Fifth Generation New Radio (5GNR), 5G Advanced, LTE, Institute of Electrical and Electronic Engineers (IEEE) 802.11 (Wifi), Low-Power Wide Area Network (LP-WAN), Near-Field Communications (NFC), Code Division Multiple Access (CDMA), Frequency Division Multiple Access (FDMA), and Time Division Multiple Access (TDMA).

Figure 12:
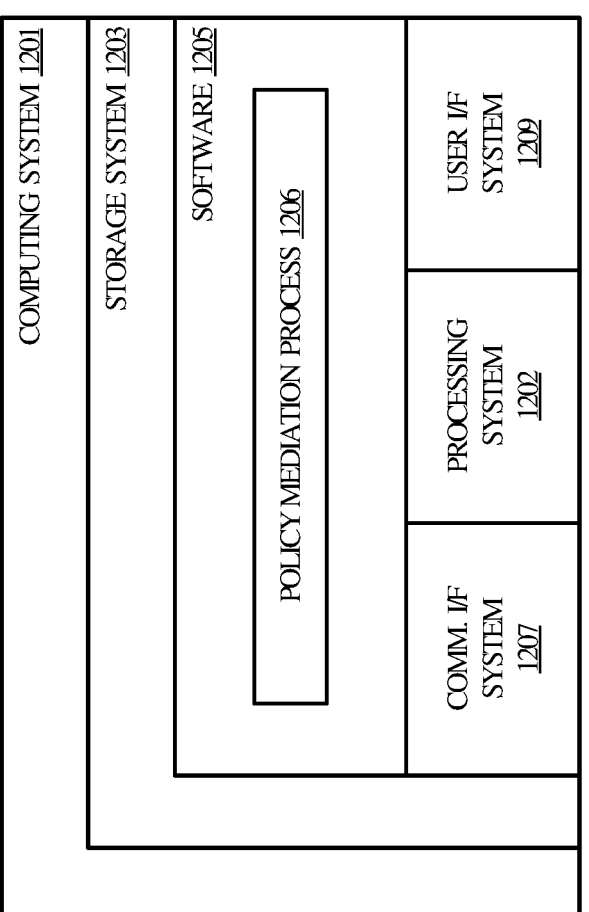
FIG. 12 illustrates a computing system suitable for implementing the various operational environments, architectures, processes, scenarios, and sequences discussed below with respect to the other Figures.

Network elements 103 are representative of network functions and elements which constitute the control plane and user plane of a wireless communication network core. For example, network elements 103 can include UDMs, AMFs, SMFs, PCFs, and UPFs, as well as other network functions. Network elements 103 are implemented on one or more suitable computing devices, of which computing device 1200 of FIG. 12 is representative. Examples include server computers, blade servers, and the like. Network elements 103 may be implemented in the context of one or more data centers, in a co-located or distributed manner, or in some other arrangement.

PEPs 104 are representative of single points of access to resource 109. (It may be appreciated that PEPs 104 represent one or more PEPs of a wireless communication system.) PEPs 104 may execute within an AMF, SMF, or UPF of network elements 103 or may be distributed between multiple AMFs, SMFs and/or UPFs of network elements 103. In an implementation, PEPs 104 are shared by entities MNO 121, MVNO 122, and/or enterprise 123 and enforce security policies for security domains of those entities. (It may be appreciated that security domains of other entities may be present which control access by UE 101 to resource 109 but which are not shown for the sake of clarity.) In operation, PEPs 104 receive requests for access authorization originating from UE 101 and send the requests to PAF 108 for an access authorization decision. PEPs 104 receive access authorization policy decisions from PAF 108 and act on those decisions accordingly.

In some implementations, PEPs 104 may be hosted by MNO 121 on behalf of MVNO 122 and enterprise 123. PEPs 104 may be front-end PEPs or an intermediate PEPs, controlling access, for example, according to network slice or traffic granularity. Thus, for example, PEP 143 may be operated by MNO 121 and shared with MVNO 122 and enterprise 123, or it may be jointly operated by MNO 121 and enterprise 123 (and/or MVNO 122). Further, control of PEPs 104 may be allocated amongst the various entities at different OSI levels, at different levels of traffic granularity, or according to other access request parameters.

PAF 108 is representative of a network function capable of interfacing with policy enforcement points and policy decision points, such as PEPs 104 and PDPs 107 of FIG. 1, for mediating security policies or policy decisions and providing the policy mediation function processes, services, and methods described herein. (It may be appreciated that the PDPs 107 represent one or more PDPs of a wireless communication system.) In an implementation, PAF 108 receives policies or policy decisions from one or more policy sources in deciding an access authorization request and transmits one or more policy decisions to one or more access enforcement points of the object of the request.

PAF 108 may be implemented in the context of one or more data centers and one or more computing devices of which computing device 1201 of FIG. 12 is representative. PAF 108 may be a stand-alone network function or a function distributed amongst various components of a wireless communication system, such as network elements 103, RAN 102, and UE 101. In various implementations, PAF 108 may be implemented in software, hardware, firmware, or any combination thereof. For example, PAF 108 may be implemented in software on a suitable computing device having appropriate circuitry for carrying out the steps defined by the software. For instance, communication circuitry of the computing device may interface with PDPs 107 and PEPs 104. Similarly, processing circuitry of the computing device may mediate the multiple policies or policy decisions from PDPs 107 as applied to the information or parameters of an access authorization request received from one or more of PEPs 104.

In a brief example, PAF 108 receives the request for access authorization from PEP 142 and receives policies or policy decisions from one or more of PDPs 107. PAF 108 mediates conflicting policies of PDP 131 and 133 and makes an access authorization decision which it then returns to PEP 142 for implementation. Mediating multiple policies or policy decisions can include overriding a policy when two or more policies are in conflict or harmonizing policies when there are mixed levels of control between the multiple entities. An access authorization decision may permit access, or deny access, or PEP 142 may return an indication that the request is indeterminate (e.g., lacks sufficient information on which to make a decision) or that the request is inapplicable. In some implementations, PAF 108 sends an indication to one or more of PDPs 107 that policies of those PDPs were not selected or not implemented in response to an access request. For example, if a policy supplied by PDP 133 is not implemented, PAF 108 may send an indication to PDP 133 that its policy was overruled, along information relating to the selected policy.

PDPs 107 are representative of network policy servers which supply policy information for the security domains of MNO 121, MVNO 122, and enterprise 123 of the wireless communication network. PDPs 107 provide policies or policy decisions to PAF 108 for deciding an authorization request. In various implementations, each of PDPs 107 may retrieve policies from a Policy Administration Point (PAP) which manages authorization policies and may retrieve information concerning request attributes from a Policy Information Point (PIP). Request attributes can include information relating to the subject (e.g., UE 101) that is requesting access, the object of the request (e.g., resource 109), actions taken with respect to the object of the request, and/or environmental conditions.

Resource 109 is representative of a network data, device, or service which UE 101 seeks to access. Resource 109 is protected by one or more of PEPs 104 which receive requests for access from a user, device, or service, and implement an access decision received from PAF 108. In an implementation, PEPs 104 are representative of multiple PEPs, each of which receives policies selected by a PAF according to its scope of control over the access request. In some implementations, each of PEPs 104 is an access point shared by entities MNO 121, MVNO 122, and enterprise 123. In other implementations, various ones of PEPs 104 are hosted by, for example, MNO 121 and made available to MVNO 122 and enterprise 123.

In operation, in wireless communication system 100, UE 101 submits a request to access data, a device, or a service from resource 109 of enterprise 123. For example, the request may be to access a document, to submit information, to obtain a service, and so on, from resource 109. Path 110 of the request traverses the security domains of entities MNO 121, MVNO 122, and enterprise 123 which may be operating resource 109. Each of the entities has a dedicated PDP of PDPs 107 for controlling access to various network resources.

One or more of PEPs 104 receive the request for access and transmit the request to PAF 108. PAF 108 in turn retrieves policies or policy decisions from PDPs 107 of MNO 121, MVNO 122, and enterprise 123. In an implementation, PAF 108 correlates the policies or decisions according to OSI level and selects the policy or policy decision to be applied at various levels. PAF 108 then applies the selected policies or decisions to the request to render a decision on access authorization. PAF 108 transmits the mediated policy or decision to individual ones PEPs 104 for implementation according to the scope of control or layers of control of the individual PEPs.

In an implementation, PAF 108 receives the security policies or policy decisions from PDPs 107. In a zero-trust environment, security policies may be independently defined by the respective entities, so the policies may differ according to various parameters or attributes of the request, such as traffic granularity, the level of the OSI model or other interconnect model, transaction type, access scheduling, and applicable network slice. For example, PAF 108 may mediate conflicts arising when an enterprise PDP and an operator PDP have conflicting policies at the 5G session level of the protocol stack. Alternatively, PAF 108 may harmonize the policies of an operator PDP which apply at the 5G session level with the policies of the enterprise PDP which apply a finer or more granular level of control at a higher protocol level. Thus, in mediating policies or policy decisions from multiple sources or entities, PAF 108 may resolve head-to-head conflicts at a particular protocol stack level or harmonize policies or decisions at different levels.

PAF 108 may also resolve conflicts arising in policies or decisions defined according to bearer level (i.e., user plane or control plane). In network communication, the control plane defines the network topology and includes network functions which control how data packets are forwarded on the network, such as routing protocols. The user plane includes network functions for the actual moving or forwarding of the data packets. For example, an operator PDP may provide policies or decisions at the control plane, while the enterprise PDP may control the user plane. In an implementation, PAF 108 harmonizes the policies or decisions when the policies or decisions of the operator PDP and the enterprise PDP apply at different levels of traffic granularity.

In an implementation, PAF 108 may mediate multiple conflicting decisions according to a rule set. For example, if multiple conflicting decisions relate to the same bearer level (e.g., at the control plane level), then a rule may specify that the most restrictive decision governs. In an implementation, the PDPs whose decisions are overridden are informed about the override, which may facilitate PDP coordination or cooperation regarding authorization decisions.

If, for another example, policies are the same but for different traffic granularities, then PAF 108 relays the most restrictive granularity. If different policies apply to different points in the protocol stack, the conflict may be mediated by blocking a particular transaction type while allowing traffic at lower levels. Alternatively, the conflict may be mediated by blocking a particular application in its entirety but allowing the session to continue.

In an implementation, if a PDP decides to re-assess an authorization decision and another PDP does not, PAF 108 will maintain the authorization state from both PDPs and re-perform the mediation function between the new access authorization decision and the stored access authorization according to the defined rule set.

In various implementations, PEPs 104 apply policy decisions for a particular level (or levels) of control, while PDPs 107 may have flexibility in authorizing access according to traffic granularity. In mediating conflicting policies or policy decisions, PAF 108 may direct any one or more of PEPs 141, 142, and 143 to control access in various ways relative to the scope of control of PEPs 141, 142, and 143. Access control policies applied by PEPs 104 may specify control according to factors such as a range of IP addresses, transaction type, user or user agent, and/or resource. For example, if PEP 141 controls HTTP transaction types (but not, say, all TCP sessions), it may receive from PAF 108 a policy or decision to block a particular user which would result in blocking all HTTP transactions for that user. Alternatively, PEP 141 may receive a policy or decision regarding a particular type of transaction, such as a PUT, and block all PUT transactions for that user. In still other implementations, PEP 141 may receive a policy or decision regarding a specific resource and block all HTTP transactions against that resource. Moreover, PEPs 104 may execute access control policies according to a hierarchy or order of preference. Thus, PEP 141 may receive decisions with varying scopes of authorized access but which would only apply at the protocol stack level which PEP 141 is authorized to control.

In resolving conflicts between PDP policies or policy decisions, the mediation rules applied by PAF 108 may be formulated with respect to when policy decisions arrive (at the same time or at different times), when there are differences in the decisions or policies, such as their granularities, when one of the PDPs refreshes its authorization decision, or when there is a disconnect or a decision is blocked from one PDP. Mediation rules may also include rules for informing other PDPs when mediation results in, for example, the policies or decisions of one PDP overruling those of the other PDPs.

Figure 2:
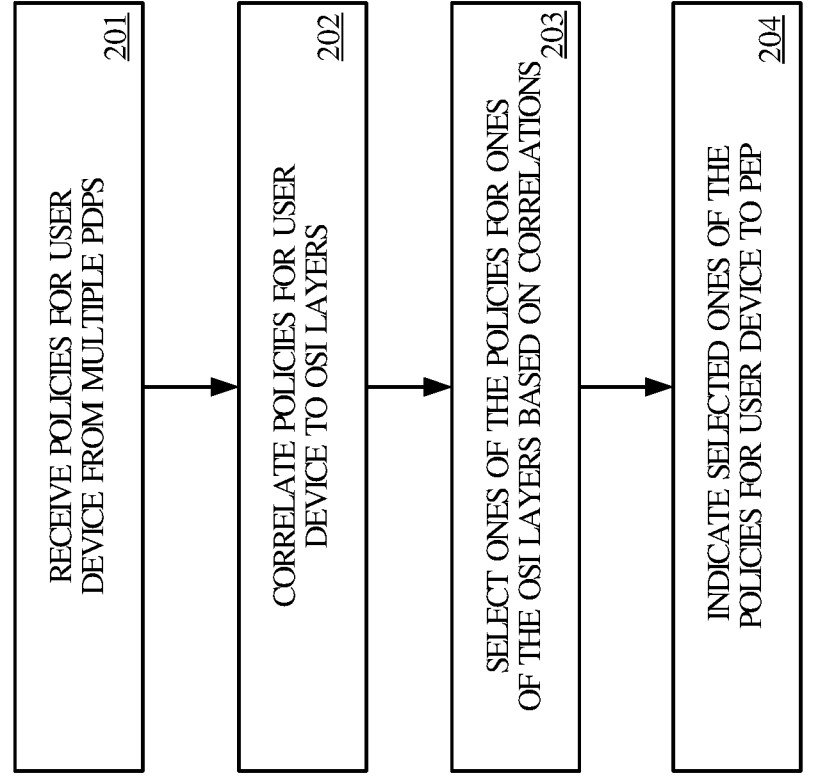
FIG. 2 illustrates an exemplary operation of the wireless communication system to serve the wireless communication device based on the policies.

FIG. 2 illustrates process 200 performed by a network function such as PAF 108 of FIG. 1, to mediate policy decisions from PDPs. The PAF may execute on any one or more of the network elements of a communication network core, a RAN, and/or user equipment according to program instructions which direct the PAF to function as follows, referring parenthetically to the steps in FIG. 2 and in the singular for the sake of clarity.

In process 200, a user device, such as a smartphone or other wireless communication device, is in communication with a wireless communication network, such as a 5GNR network. The user device requests access to a resource over the network. The access request is relayed to a PEP which controls access to the resource. The PEP formulates an access request for submission to a PAF. The PAF receives the access request from the PEP and also receives policies or policy decisions relating to access by a user device from multiple PDPs (step 201). Each of the multiple PDPs supplies policies or policy decisions for a security domain of an entity executing some manner of control over the communication network and/or the network resource. In an implementation, the PAF correlates the policies or policy decisions relating to the access request according to the interconnect model layer, such as an OSI layer, to which the policies apply (step 202). For example, one or more policies may apply to the presentation layer, while another policy may apply to the network layer. The PAF selects ones of the policies or policy decisions for each of the OSI layers where there are multiple applicable policies (step 203). For example, the PAF may select the most restrictive policy for the presentation layer. With the policies selected, the PAF communicates the selected policies to the PEP for implementation (step 204). Upon receiving the selected policies or policy decisions, the PEP may implement the decisions or may distribute the policies to various network elements, the RAN, or the user device for implementation. In some implementations, the PDPs whose policies were overridden by the PAF are notified of the override, for example, to flag inconsistent policies between the relevant entities.

The steps of process 200 may be performed in some implementations by elements of the one or more computing devices on which the PAF is implemented. For instance, communication circuitry of the computing devices may provide the interface by which the PAF communicates with the PDPs and the PEP, and processing circuitry of the computing devices may perform the policy mediation functions (e.g., policy correlation, policy selection, policy harmonization, etc.).

Referring again to FIG. 1, wireless communication system 100 illustrates a brief example of process 200 as employed by elements of wireless communication system 100. In operation, user equipment 101 requests access to resource 109 through wireless communication system 100. The request is transmitted via RAN 102 and network elements 103 to one or more of PEPs 104.

Upon receiving the request, the one or more of PEPs 104 submits a request to PAF 108 for a policy or policy decision regarding authorizing access to resources of the network. PAF 108 receives policies from one or more PDPs 107 by which authorization for access is to be determined. In an implementation, PAF 108 correlates the policies received from PDPs 107 to the applicable layers of the OSI model. With the policies correlated, PAF 108 then selects a policy for each of the applicable layers of the OSI model. PAF 108 then transmits the selected policies to PEPs 104 according to the layer of the OSI model controlled by the individual PEPs. For example, PEP 141 may control the application and presentation layers of the OSI model. PAF 108 transmits to PEP 141 access authorization policies selected for those layers. PEP 141 then implements those policies for user equipment 101.

Figure 3:
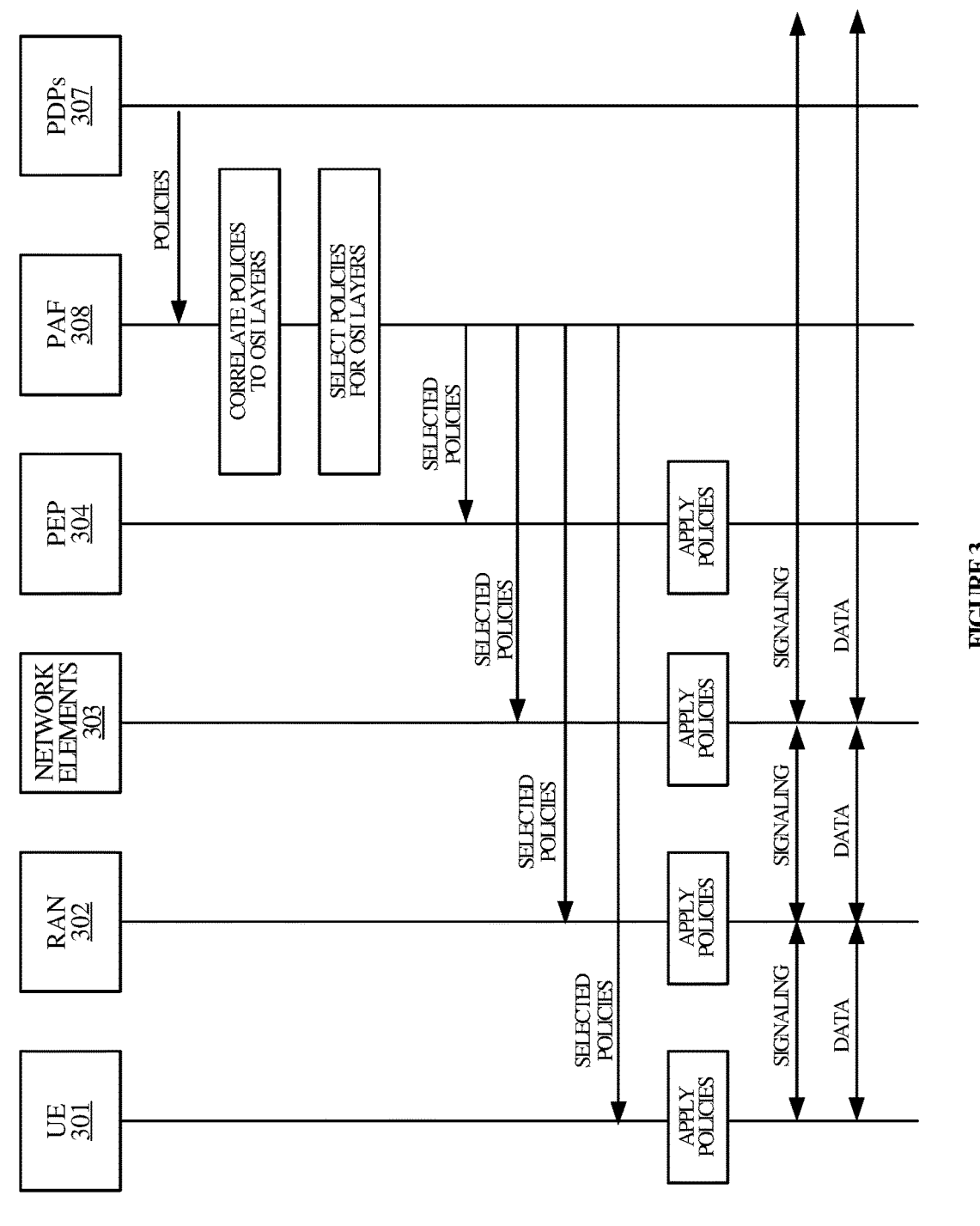
FIG. 3 illustrates an exemplary operation of the wireless communication system to serve the wireless communication device based on the policies.

FIG. 3 illustrates an exemplary operation of wireless communication system 300 to serve user equipment 301 based on the policies. In an implementation, each of PDPs 307 transmits policies for deciding an access authorization request to PAF 308. PAF 308 correlates the policies received from PDPs 307 by OSI layer. For each OSI layer that is applicable to the access request, PAF 308 selects a governing policy for that layer. PAF 308 then transmits the selected policy or policies to PEP 304 for implementation.

Upon receiving the selected policies from PAF 308 based on the OSI correlations, PEP 304 distributes selected policies to network elements 303, RAN 302, and UE 301 as applicable. Each of network elements 303, RAN 302, and UE 301 implements the selected policies with respect to a request for access authorization. With the selected policies enacted, the various network functions perform their respective user plane ("data") and control plane ("signaling") functions.

Figure 4:
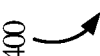
FIG. 4 illustrates an exemplary wireless communication system that serves a wireless User Equipment (UE) based on policies.

FIG. 4 illustrates exemplary wireless communication system 400 that serves wireless User Equipment (UE) 402 based on policies. Wireless communication system 400 comprises User Equipment (UEs) 402 and 442, Wifi Access Nodes (ANs) 403-404, 5GNR ANs 405-406, Interworking Functions (IWFs) 407-408, Access and Mobility Management Functions (AMFs) 409-410, Unified Data Managements (UDMs) 411-412, Policy Control Functions (PCFs) 414-415, Session Management Functions (SMFs) 415-416, User Plane Functions (UPFs) 417-418, Policy Application Function (PAF) 421, and Application Server (AS) 450. IWFs 407 and 408 can include non-3GPP IWFs (N3IWFs) for providing untrusted non-3GPP access to the respective network data centers. Wireless network slices 419-420 include respective UPFs 417-418. Network data center 430 includes IWF 407, AMF 409, UDM 411, PCF 413, SMF 415, UPF 417, and PAF 421. Network data center 440 includes IWF 408, AMF 410, UDM 412, PCF 414, SMF 416, and UPF 418.

UDMs 411-412 and PCFs 413-414 are examples of PDPs, such as PDPs 307, although PDPs 307 may differ. AMFs 409-410 and SMF 415-516 are examples of PEP 304, although PEP 304 may differ. PAF 421 is an example of PAF 308 and may comprise a Network Exposure Function (NEF) and an Application Function (AF). At least some portions of PAF 421 may be distributed within or across at least one of UDMs 411-412, PCFs 413-414, AMFs 409-410 and SMF 415-516.

In an implementation, UE 402 is an authorized user of the communication network of network data center 440 but has roamed onto the communication network of network data center 430. UE 402 communicates with network data center 430 via Wifi access node 403 or 5GNR access node 405. UE 402 requests access to AS 450, which may be a third-party server, via the communication network of network data center 430. PAF 421 receives the access request pertaining to UE 402 accessing AS 450 from AMF 409 and SMF 415, each of which is PEP enforcing various aspects of the access request from UE 402. PAF 421 receives policies or policy decisions from UDM 411 and PCF 413 as well as UDM 412 and PCF 414 of network data center 440 (either directly or indirectly via the roaming interface between networks and PCF 413). PCF 414 and UDM 412 supply policies relating to the authorized access UE 402 has on its "home" network, i.e., the communication network of network data center 440. PAF 421 also receives access authorization policies from AS 450. For example, AS 450 may provide policies applicable to control plane functions, that is, to the application, presentation, and/or session layers of the OSI protocol stack.

Figure 5:
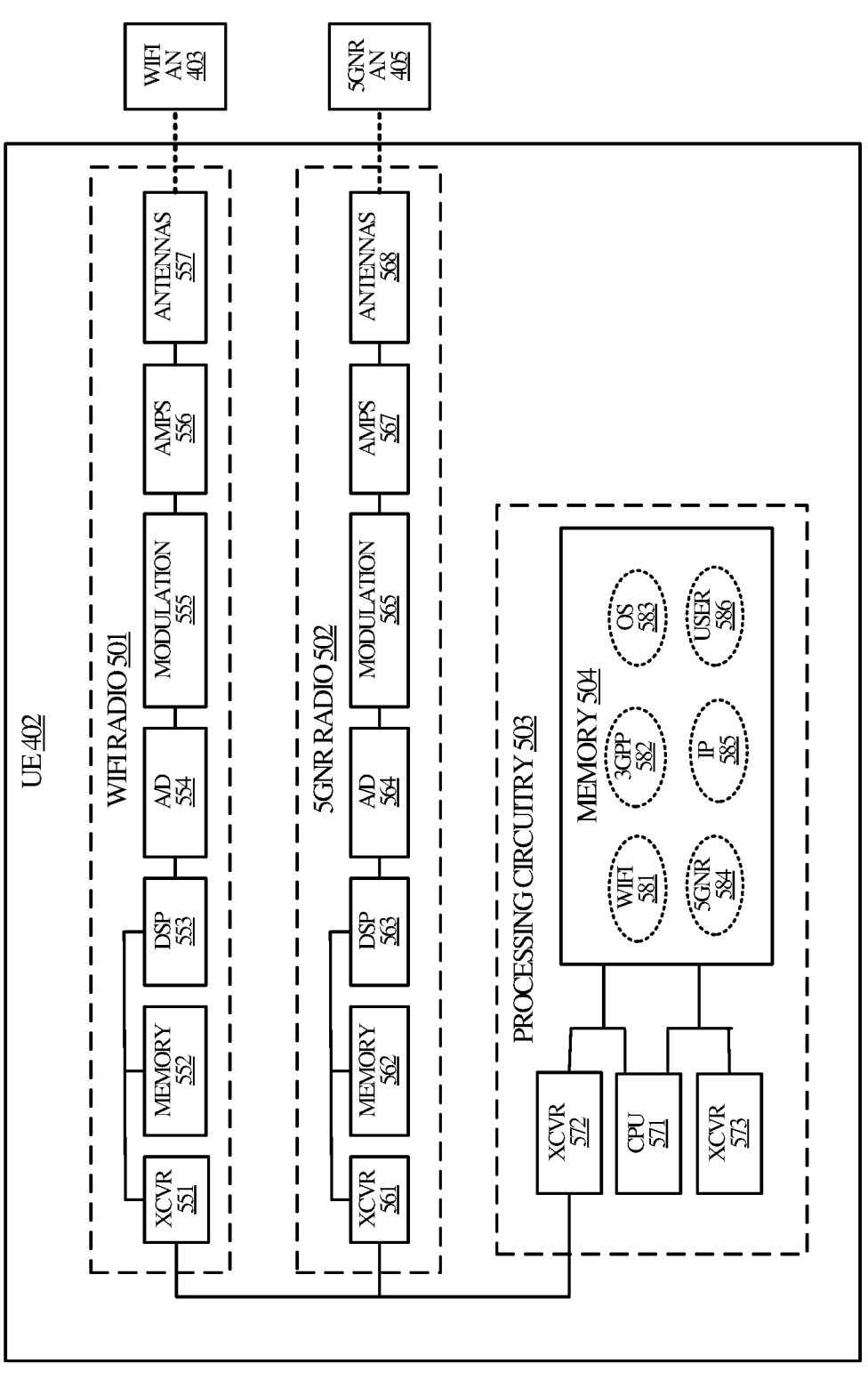
FIG. 5 illustrates an exemplary wireless UE in the wireless communication system.

In receiving policies from multiple network functions, policies supplied by PCF 413 and 414 may apply to the same OSI layer(s) and may conflict in the type of access UE 402 is allowed. Similarly, the policies of UDM 411 and 412 may also conflict in the types of access UE 402 is allowed. PAF 421 correlates policies received from UDM 411, PCF 413, UDM 412, and PCF 414 according to OSI layer and selects policies to apply to the access request from UE 402. For example, PAF 421 may select the most restrictive policy of a set of conflicting policies to satisfy the constraints of all the conflicting policies. Alternatively, PAF 421 may select a policy based on an agreement between the operators of network data centers 430 and 440 regarding roaming usage. PAF 421 relays the selected policies to PEPs AMF 409 and SMF 415 to implement. UE 402's access to AS 450 is then governed by the selected policies FIG. 5 illustrates exemplary UE 402 in wireless communication system 400, of which UE 101 of FIG. 1 is representative. UE 402 includes Wifi radio 501, 5GNR radio 502, and processing circuitry 503, which communicate with each other using transceivers 551, 561, and 572.

Wifi radio 501 of UE 402 includes hardware and software components by which UE 402 communicates with Wifi access node 403. Wifi radio 501 receives signals from Wifi access node 403 using antennas 557. From antennas 557, the signals are transmitted to amplifiers 556, then to modulation component 555, to analog-to-digital (A/D) convertor 554. From A/D convertor 554, the digitized signal is transmitted to digital signal processor (DSP) 553 which is operatively connected to memory 552 and transceiver 551. Transceiver 551 is also in communication with 5GNR radio 502 via transceiver 561 and processing circuitry 503 via transceiver 572.

5GNR radio 502 of UE 402 includes hardware and software components by which UE 402 communicates with 5GNR access node 405. 5GNR radio 502 receives signals from 5GNR access node 405 using antennas 568. From antennas 568, the signals are transmitted to amplifiers 567, to modulation element 565, and to A/D convertor 564. From A/D convertor 564, the digitized signals are transmitted to digital signal processor 563 which is operatively coupled to memory 562 and transceiver 561. Transceiver 561 communicates with transceiver 551 of Wifi radio 501 and transceiver 572 of processing circuitry 503.

Processing circuitry 503 of UE 402 includes central processing unit (CPU) 571, transceivers 572 and 573, and memory 504. CPU 571 may also include one or more general processing units (GPUs). Memory 504 stores software or program instructions for performing the methods and processes described herein, including Wifi application software 581, 3GPP (3$^{rd}$ Generation Partnership Project) application software 582, operating system (OS) software 583, 5GNR application software 584, IP application software 585, and user application software 586 for gaming applications, virtual reality applications, and so on.

Figure 6:
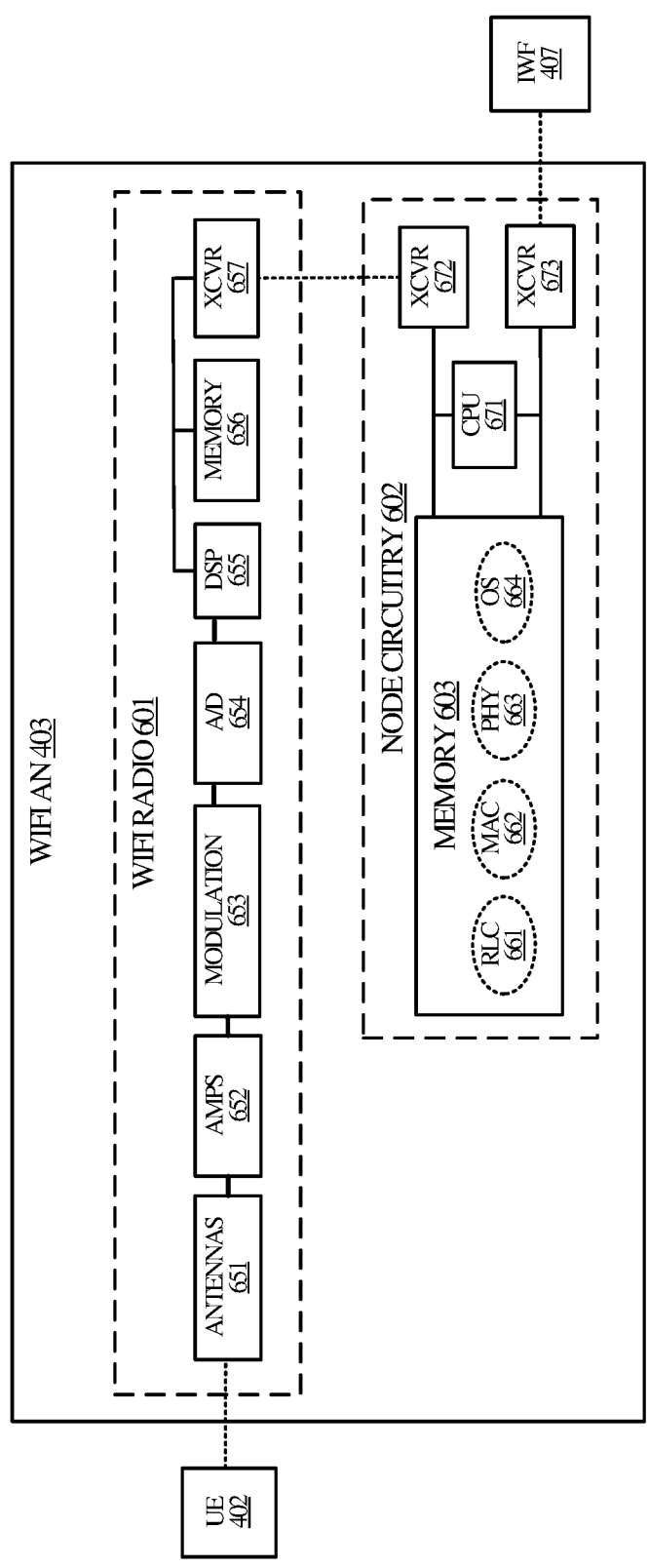
FIG. 6 illustrates an exemplary Wi-Fi access node in the wireless communication system.

FIG. 6 illustrates exemplary Wifi access node 403 of wireless communication system 400, of which RAN 102 of FIG. 1 is representative. Wifi access node 403 includes Wifi radio 601 which includes hardware and software components by which to communicate wirelessly with UE 401. Wifi radio 601 includes antennas 651, amplifiers 652, modulation 653 including filters and modulators, A/D convertor 654, digital signal processors (DSPs) 655, memory 656, and transceiver 657 that are coupled over bus circuitry. Wifi access node 403 also includes node circuitry 602 which includes various transceivers, processors, and memory components storing program instructions for performing the methods and processes described herein.

Wifi radio 601 of Wifi access node 403 includes antennas 651 which receive signals from UE 402. The signals are transmitted from antennas 651 to amplifiers 652, to modulation 653, to A/D convertor 653, and then to digital signal processor 665. Digital signal processor 665 is operatively connected with memory 656 and transceiver 657. Transceiver 657 also communicates with transceiver 672 of node circuitry 602.

Node circuitry 602 of Wifi radio 601 includes memory 603, CPU 671 (which can include one or more GPUs), transceiver 672 for communicating with Wifi radio 601, and transceiver 673 for communicating with IWF 407. Memory 603 includes software for network logic and transport layer interfaces, such as radio link control (RLC) software 661, medium access control (MAC) software 662, physical layer (PHY) software 663, and operating system software 664.

Figure 7:
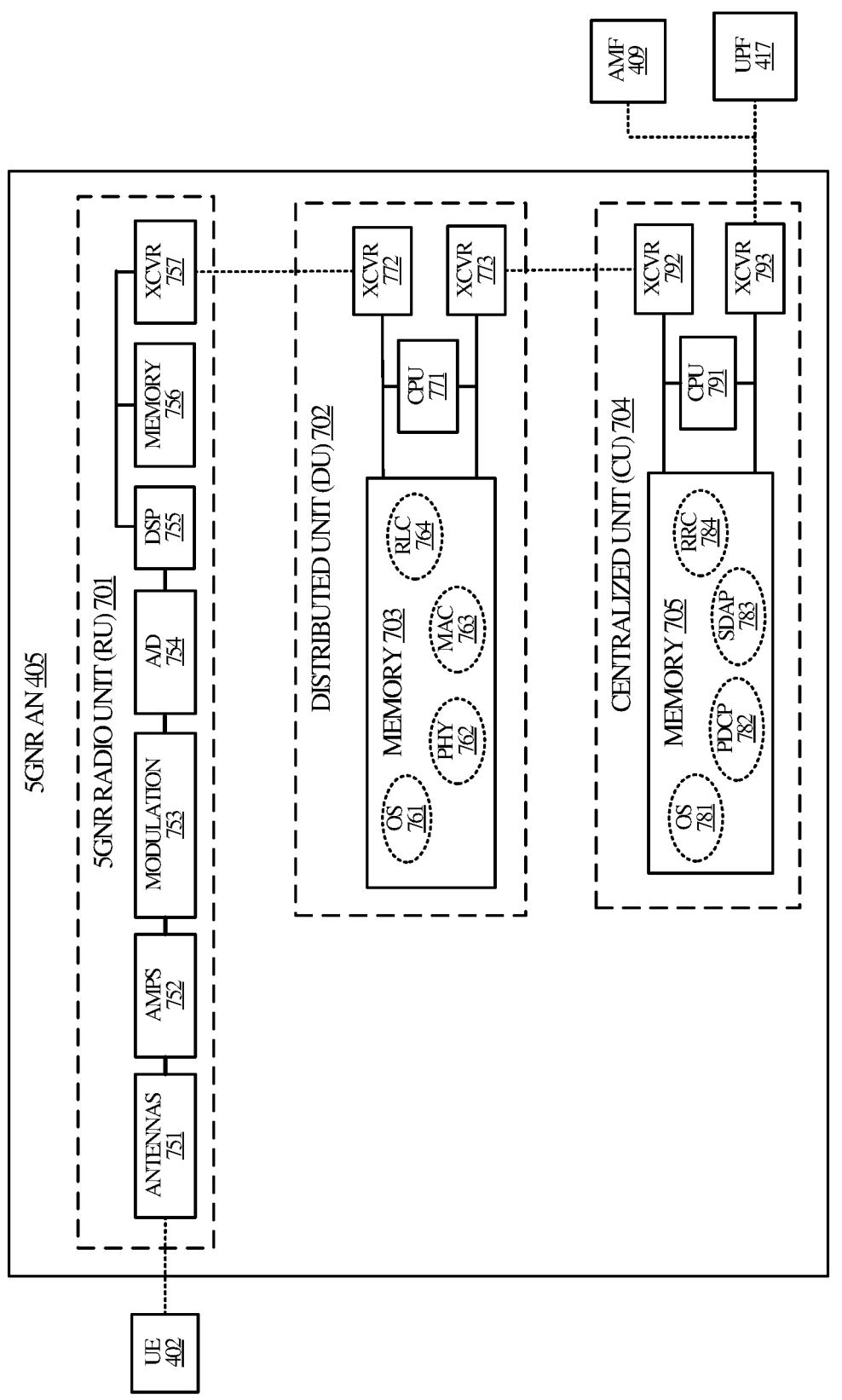
FIG. 7 illustrates an exemplary 5GNR access node in the wireless communication system.

FIG. 7 illustrates exemplary 5GNR access node 405 in wireless communication system 400, of which RAN 102 of FIG. 1 is representative. 5GNR access node 405 communicates wirelessly with user equipment 402 using 5GNR radio unit 701. 5GNR radio unit 701 communicates with distributed unit 702 which, in turn, communicates with centralized unit 704. Centralized unit 704 communicates the network functions AMF 417 and UPF 419 of network data center 430. Each of 5GNR radio unit 701, distributed unit 702, and centralized unit 703 include hardware and software components by which to communicate wirelessly with each other and with user equipment 402.

5GNR radio unit 701 receives signals from user equipment 402 using antennas 751. From antennas 751, the signals are transmitted to amplifiers 752, to modulation element 753, and then to A/D convertor 754. From A/D convertor 754, the digitized signals are transmitted to digital signal processor 755 which is operatively coupled to memory 756 and transceiver 757 of 5GNR radio unit 701. Transceiver 757 is also in communication with transceiver 772 of distributed unit 702. Distributed unit 702 includes transceiver 772, transceiver 773 by which distributed unit 702 communicates with centralized unit 704, CPU 771 (which can include one or more GPUs), and memory 703. Memory 703 includes software and/or program instructions such as OS 761, PHY 762, MAC 763, and RLC 764. Centralized unit 704 of 5GNR access node 405 includes CPU 791 (which can include one or more GPUs), transceiver 792 for communicating with distributed unit 702 and transceiver 793 for communicating with AMF 409 and UPF 417 of network data center 430. Memory 705 of centralized unit 704 includes software and/or program instructions such as OS 781, packet data convergence protocol (PDCP) 782, service data adaption protocol (SDAP) 783, and radio resource control (RRC) 784.

Figure 8:
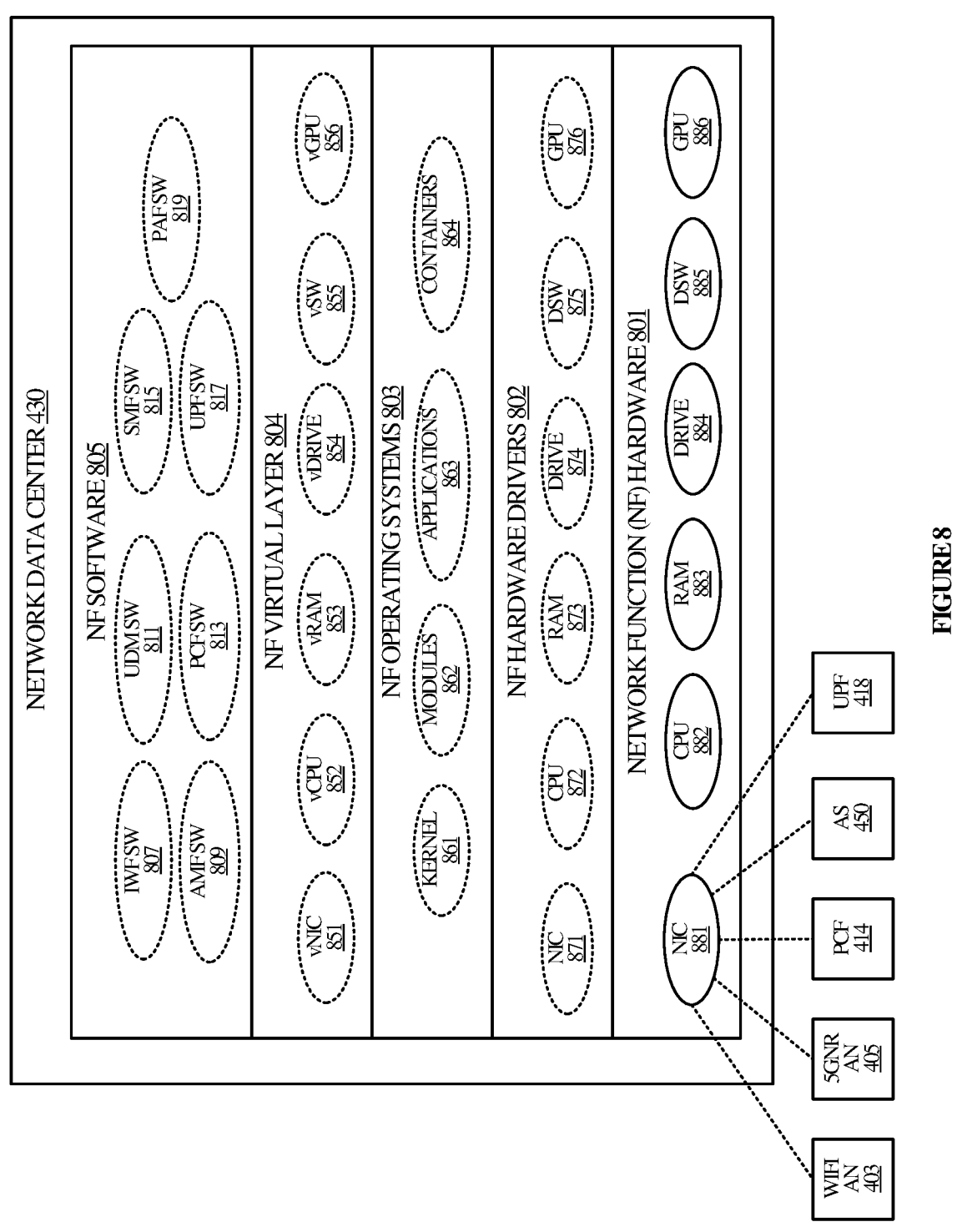
FIG. 8 illustrates an exemplary data center in the wireless communication system.

FIG. 8 illustrates exemplary network data center 430, a network core of wireless communication system 400, of which network elements 103, PEPs 104, PAF 108, and PDPs 107 of FIG. 1 are representative. Network data center 430 includes network function (NF) software 805, network function virtual layer 804, network function operating systems 803, network function hardware drivers 802, and network function hardware 801.

Network function software 805 of network data center 430 includes software for executing various network functions: IWF software 807, AMF software 809, UDM software 811, PCF software 813, SMF software 815, UPF software 817, and PAF software 819. PAF software 819 includes the functions, methods, and processes described herein for performing policy mediation. Other network function software, such as network repository function (NRF) software, are typically present but are omitted for clarity.

Network function virtual layer 804 includes virtualized components of network data center 430, such as virtual NIC 851, virtual CPU 852, virtual RAM 853, virtual drive 854, virtual software 855, and virtual GPU 856. Network operating systems 803 includes components for operating network data center 430, including kernels 861, modules 862, applications 863, and containers 864 for network function software execution. Network function hardware drivers 802 include software for operating network function hardware 801 of network data center 430, including network interface card (NIC) drivers 871 for NICs 881, CPU drivers 872 for CPUs 882, RAM drivers 873 for RAM 883, flash/disk drive drivers 874 for flash/disk drives 884, data switch (DSW) drivers 875 for data switches 885, and drivers 876 for GPUs 886. Of network function hardware 801 of network data center 430, network interface cards 881 include hardware components for communicating with Wifi access node 403, 5GNR access node 405, PCF 414, application server 450, and UPF 418.

Figure 9:
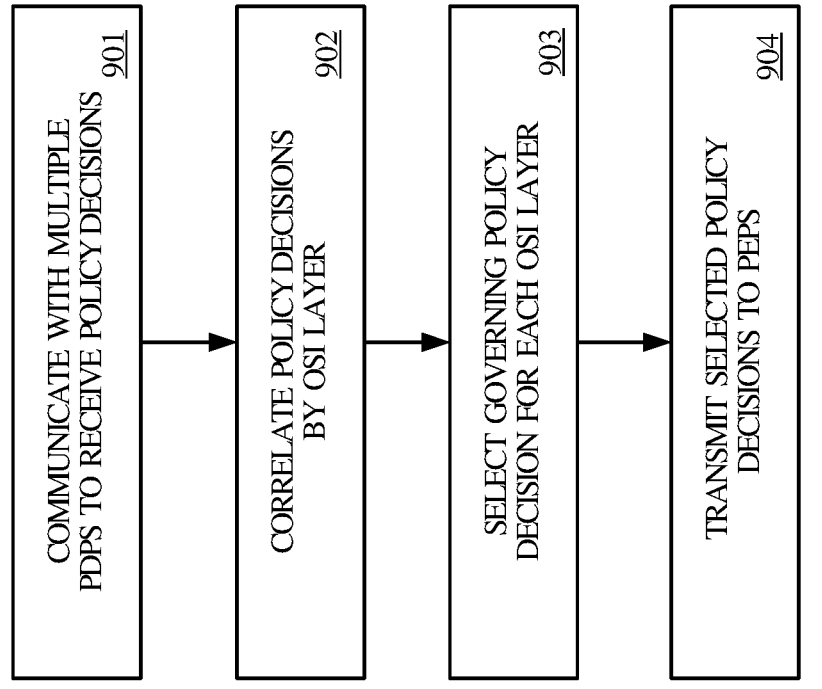
FIG. 9 illustrates a process of policy mediation by an exemplary Policy Application Function (PAF) in the wireless communication system.

FIG. 9 illustrates process 900 of mediating policies from multiple PDPs in an implementation in the context of elements of FIG. 4. In an implementation, PAF 421 receives policy decisions from various PDPs of the network functions of network data center 430 via a PDP interface or other communication circuitry (step 901). PAF 421 correlates the authorization decisions by OSI level (step 902). For example, the authorization decisions may govern network functions according to all or a subset of the seven OSI levels. PAF 421 correlates the policies for each of the applicable OSI levels. From each set of correlated policies at each of the applicable OSI layers, PAF 421 selects a policy or decision to govern an access request (i.e., to decide a request for access authorization) (step 903). In some implementations, to select a governing policy, PAF 421 selects the most restrictive policy for an OSI level. In the same or other implementations, PAF 421 harmonizes policies according to rules for managing multiple conflicting or overlapping policies. For example, for a given OSI level, one authorization decision may vary with network slice while another is a function of traffic granularity. PAF 421 may harmonize the policies by creating a hybrid policy implementing aspects of both policies. In still other implementations, the PAF 421 may preferentially select a policy according to a hierarchy of parameters, where, for example, an authorization decision regarding IP addresses preempts authorization decisions regarding transaction type. PAF 421 then transmits the selected policy decisions to various ones of the PEPs of network data center 430 via a PEP interface or other communication circuitry (step 904). PAF 421 transmits the selected decisions according to the scope of control of each of PEPs. The PEPs, in turn, implement the transmitted policies or decisions with respect to the access request accordingly.

Figure 10:
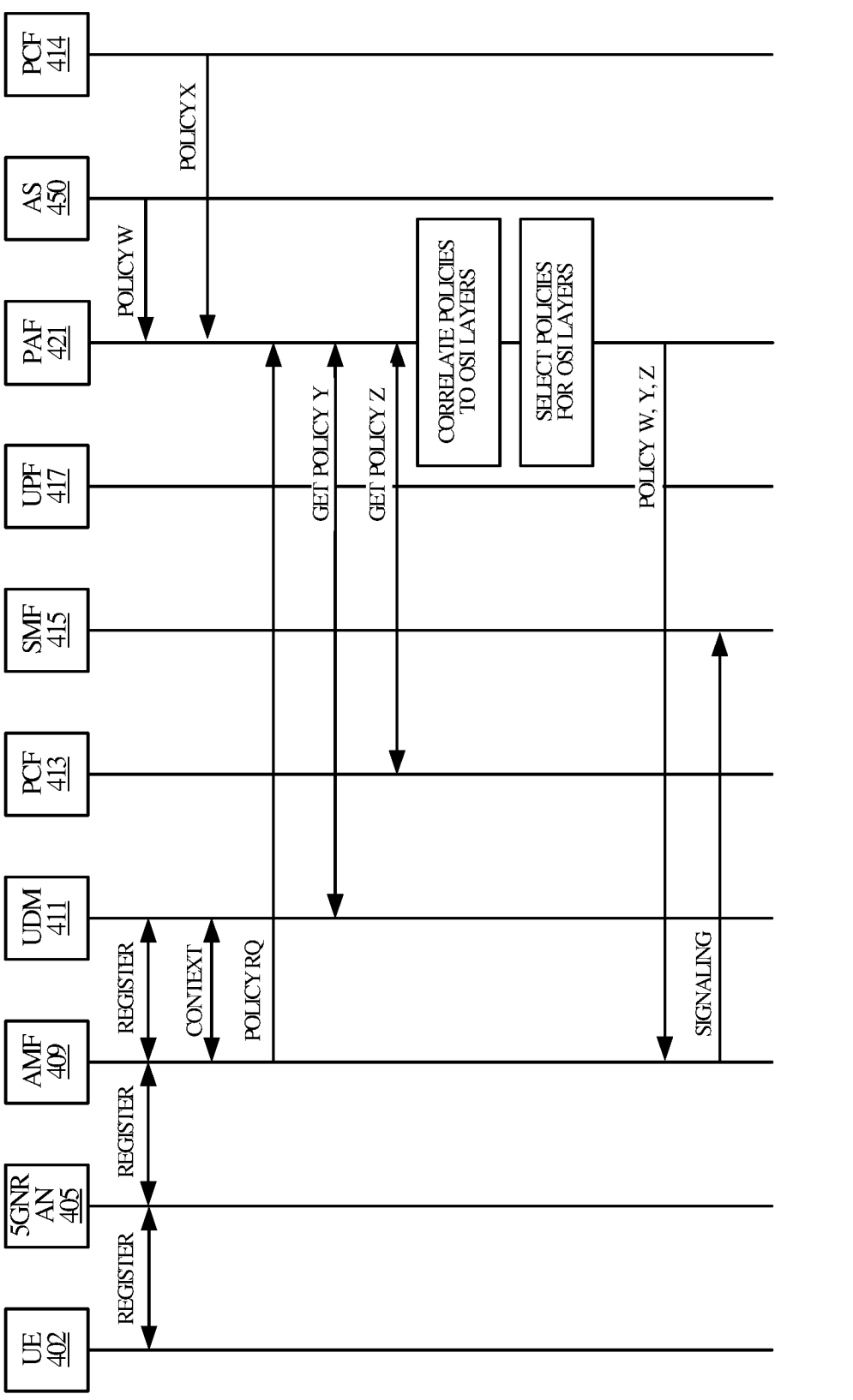
FIG. 10 illustrates an exemplary operation of the wireless communication system to serve a wireless UE based on the policies.

FIG. 10 illustrates an exemplary operation of wireless communication system 400 serving roaming UE 402 based on the policies of various network functions of network data centers 430 and 440. The operation may vary in other examples.

In the operational scenario illustrated in FIG. 10, UE 402, such as a smartphone or other wireless communication device, registers access with 5GNR access node 405 to access the communication network of network data center 430. 5GNR access node 405 in turn relays the registration to AMF 409 and UDM 411. UDM 411 requests and receives a context management registration from AMF 409. AMF 409, in the role of a PEP, sends an access request on behalf of UE 401 to PAF 421 which in turn receives and mediates, in this example, access control policies W, X, Y, and Z from AS 450, PCF 414, UDM 411, and PCF 413, respectively. It should be noted that policies W, X, and Y might reach PAF 421 via various paths such as inter-network roaming interfaces, roaming gateways, exposure gateways such as NEF, PCF 414, PCF 413, and so on which are not shown for clarity.

In an implementation, access control policies W, X, Y, and Z govern various aspects of UE 402's request for access to third-party AS 450 via the communication network of network data center 430. Policy W of AS 450 governs user requests to access one or more services operated by AS 450. For example, Policy W may include user authorization information, access schedules, and availability of services for particular user accounts. Policy X of PCF 414 may govern access requests relating to control plane functions of UE 402's "home" network of network data center 440. Policy Y of UDM 411 may govern various access authorization policies including authorization based on the identity of the requester. Policy Z from PCF 413 may govern access to control plane functions of the communication network of network data center 430, for which UE 402 is a roaming visitor. Upon receiving policies W, X, Y, and Z, PAF 421 correlates the policies according to OSI layer, then selects a governing policy from among each set of correlated policies. For example, PAF 421 selects policy Y over policy X as the governing policy. PAF 421 transmits the selected policies W, Y, and Z, to AMF 409 which implements the selected policies in allowing access to UE 402 within the scope of AMF 409's control. AMF 409 then signals SMF 415 to create a new session for UE 402 to communicate with AS 450.

In some implementations, UE 401 may connect to the communication network of network data center 430 via an untrusted non-3GPP network or non-cellular access network, such as a Wifi local area network. Communication between UE 401 on an untrusted network and AMF 409 may be relayed through a non-3GPP IWF (N3IWF) rather than through 5GNR AN 405.

Figure 11:
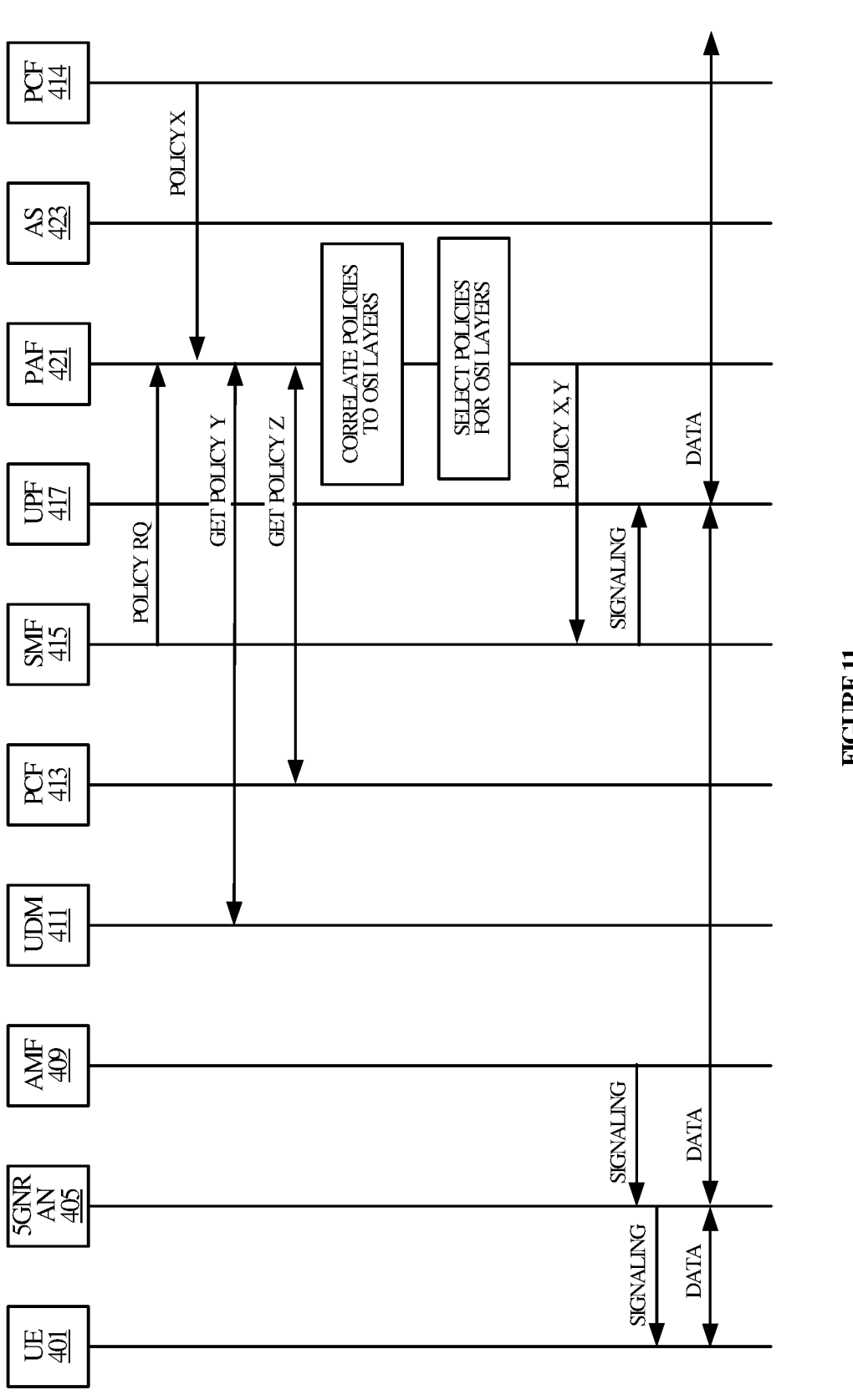
FIG. 11 illustrates an exemplary operation of the wireless communication system to serve a wireless UE based on the policies.

FIG. 11 continues the exemplary operation of wireless communication system 400 in FIG. 10. In FIG. 11, SMF 415, as a PEP, requests from PAF 421 an access authorization decision to create a new session for UE 402. PAF 421 requests and receives policies Y and Z from UDM 411 and PCF 413, respectively. PAF 421 correlates the policies by OSI layer, then selects policies governing authorization by layer. In this exemplary implementation, both PCF 413 and PCF 414 have submitted control plane policies X and Z, respectively, to PAF 421. PAF 421 correlates the policies by OSI layer and selects policy X as the governing policy for control plane functions. PAF 421 transmits the selected policies X and Y to SMF 415 for implementation. SMF 415 implements the selected policies with respect to UE 402 by allowing access within the scope of SMF 415's control. With the selected policies enacted, the various network functions perform their respective user plane ("data") and control plane ("signaling") functions.

Turning now to FIG. 12, architecture 1200 illustrates computing device 1201 that is representative of any system or collection of systems in which the various processes, programs, services, and scenarios disclosed herein may be implemented. Examples of computing device 1201 include, but are not limited to, server computers, web servers, cloud computing platforms, and data center equipment, as well as any other type of physical or virtual server machine, container, and any variation or combination thereof. Examples also include desktop and laptop computers, tablet computers, mobile computers, and wearable devices.

Computing device 1201 may be implemented as a single apparatus, system, or device or may be implemented in a distributed manner as multiple apparatuses, systems, or devices. Computing device 1201 includes, but is not limited to, processing system 1202, storage system 1203, software 1205, communication interface system 1207, and user interface system 1209 (optional). Processing system 1202 is operatively coupled with storage system 1203, communication interface system 1207, and user interface system 1209.

Processing system 1202 loads and executes software 1205 from storage system 1203. Software 1205 includes and implements policy mediation process 1206, which is representative of the policy mediation processes discussed with respect to the preceding Figures, such as process 200 and process 900. When executed by processing system 1202, software 1205 directs processing system 1202 to operate as described herein for at least the various processes, operational scenarios, and sequences discussed in the foregoing implementations. Computing device 1201 may optionally include additional devices, features, or function not discussed for purposes of brevity.

Referring still to FIG. 12, processing system 1202 may comprise a micro-processor and other circuitry that retrieves and executes software 1205 from storage system 1203. Processing system 1202 may be implemented within a single processing device but may also be distributed across multiple processing devices or sub-systems that cooperate in executing program instructions. Examples of processing system 1202 include general purpose central processing units, graphical processing units, application specific processors, and logic devices, as well as any other type of processing device, combinations, or variations thereof.

Storage system 1203 may comprise any computer readable storage media readable by processing system 1202 and capable of storing software 1205. Storage system 1203 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 1203 may also include computer readable communication media over which at least some of software 1205 may be communicated internally or externally. Storage system 1203 may be implemented as a single storage device but may also be implemented across multiple storage devices or sub-systems co-located or distributed relative to each other. Storage system 1203 may comprise additional elements, such as a controller, capable of communicating with processing system 1202 or possibly other systems.

Software 1205 (including policy mediation process 1206) may be implemented in program instructions and among other functions may when executed by processing system 1202, direct processing system 1202 to operate as described with respect to the various operational scenarios, sequences, and processes illustrated herein. For example, software 1205 may include program instructions for implementing the policy mediation processes as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 1205 may include additional processes, programs, or components, such as operating system software, virtualization software, or other application software. Software 1205 may also comprise firmware or some other form of machine-readable processing instructions executable by processing system 1202.

In general, software 1205 may when loaded into processing system 1202 and executed, transform a suitable apparatus, system, or device (of which computing device 1201 is representative) overall from a general-purpose computing system into a special-purpose computing system customized to support sensor device deployments and swaps. Indeed, encoding software 1205 on storage system 1203 may transform the physical structure of storage system 1203. The specific transformation of the physical structure may depend on various factors in different implementations of this description. Examples of such factors may include, but are not limited to, the technology used to implement the storage media of storage system 1203 and whether the computer-storage media are characterized as primary or secondary, etc.

For example, if the computer readable storage media are implemented as semiconductor-based memory, software 1205 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 1207 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing device 1201 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

As will be appreciated by one skilled in the art, aspects of the present invention may be embodied as a system, method, or computer program product. Accordingly, aspects of the present invention may take the form of an entirely hardware implementation, an entirely software implementation (including firmware, resident software, micro-code, etc.) or an implementation combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Indeed, the included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the disclosure. Those skilled in the art will also appreciate that the features described above may be combined in various ways to form multiple implementations. As a result, the invention is not limited to the specific implementations described above, but only by the claims and their equivalents.

The wireless data network circuitry described above comprises computer hardware and software that form special-purpose wireless system circuitry to serve wireless user devices based on policies. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose wireless system circuitry to serve wireless user devices based on policies.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a wireless communication network to serve a wireless device based on policies enforced by enforcement, the method comprising:

by a policy application function in the wireless communication network:

receiving the policies for the wireless device from multiple policy sources having authority to control traffic associated with the wireless device;

determining correlations between the policies for the wireless device and layers of the wireless communication network based on an applicability of the policies to the layers of the wireless communication network, wherein i) the layers support the traffic associated with the wireless device and ii) the policies control network communication by the wireless device on the layers;

selecting one or more of the policies for one or more enforcement points of the wireless communication network based on the correlations; and indicating selected ones of the one or more policies for the wireless device to the one or more enforcement points; and by the one or more enforcement points:

enforcing the selected ones of the one or more policies with respect to the traffic associated with the wireless device.

2. The method of claim 1, wherein selecting the one or more policies for the one or more enforcement points based on the correlations includes mediating between conflicting ones of the one or more policies correlated to a given one of the layers.

3. The method of claim 1, wherein the multiple policy sources comprise Policy Decision Points (PDPs), wherein the one or more enforcement points comprise Policy Enforcement Points (PEPs), and wherein the layers of wireless communication network comprise layers of the Open Systems Interconnection (OSI) model.

4. The method of claim 1, wherein selecting the one or more policies for the one or more enforcement points based on the correlations comprises selecting the one or more policies that are for a user-plane for the wireless device and that are from a particular type of policy source of the multiple policy sources.

5. The method of claim 1, wherein selecting the one or more policies for the one or more enforcement points based on the correlations comprises selecting the one or more policies that are for a control-plane for the wireless device and that are from a particular type of policy source of the multiple policy sources.

6. The method of claim 1, wherein selecting the one or more policies for the one or more enforcement points based on the correlations comprises selecting the one or more policies that are related to a particular type of wireless network slice for the wireless device.

7. The method of claim 1, wherein selecting the one or more policies for the one or more enforcement points based on the correlations comprises selecting the one or more policies based on levels of traffic granularity of the one or more policies for the wireless device.

8. The method of claim 1, further comprising indicating unselected ones of the policies for the wireless device to ones of the multiple policy sources that transferred the unselected ones of the policies for the wireless device.

9. The method of claim 1, further comprising, by the policy application function:
   receiving the policies for the wireless device from the multiple policy sources comprises receiving the policies from at least one of Unified Data Managements (UDMs) and Policy Control Functions (PCFs); and
   indicating the selected ones of the one or more policies for the wireless device to the one or more enforcement points comprises transferring the selected ones of the one or more policies for the wireless device to at least one of Access and Mobility Management Functions (AMFs) and Session Management Functions (SMFs).

10. A method of operating a policy application function in a wireless communication network to serve a wireless device based on policies, the method comprising:
   receiving the policies for the wireless device from multiple policy sources having authority to control traffic associated with the wireless device;
   correlating the policies for the wireless device to layers of an interconnect model of the wireless communication network based on an applicability of the policies to the layers of the interconnect model of the wireless communication network, wherein i) the layers support the traffic associated with the wireless device and ii) the policies control network communication by the wireless device on the layers;
   selecting one or more of the policies to provide to one or more of the enforcement points based on the correlations and which of the layers correspond to each of the one or more enforcement points; and providing the one or more of the policies to the one or more enforcement points of the wireless communication network.

11. The method of claim 10, wherein selecting the one or more policies mediating between conflicting ones of the one or more policies correlated to a given one of the layers.

12. The method of claim 10, wherein the multiple policy sources comprise Policy Decision Points (PDPs), wherein the one or more enforcement points comprise Policy Enforcement Points (PEPs), and wherein the layers of the interconnect model comprise layers of the Open Systems Interconnection (OSI) model.

13. The method of claim 10, wherein selecting the one or more policies comprises selecting the one or more policies that are for a user-plane for the wireless device and that are from a particular type of policy source of the multiple policy sources.

14. The method of claim 10, wherein selecting the one or more policies comprises selecting the one or more policies that are for a control-plane for the wireless device and that are from a particular type of policy source of the multiple policy sources.

15. The method of claim 10, wherein selecting the one or more policies comprises selecting the one or more policies for a particular type of wireless network slice for the wireless device.

16. A computing apparatus comprising:
   one or more computer-readable storage media; and
   program instructions stored on the one or more computer-readable storage media that, when executed by one or more processors, direct the one or more processors to:
   identify policies for a wireless device received from multiple policy sources having authority to control traffic associated with the wireless device;
   determine correlations between the policies for the wireless device and layers of an interconnect model based on an applicability of the policies to the layers of the interconnect model, wherein i) the layers support the traffic associated with the wireless device and ii) the policies control network communication by the wireless device on the layers;
   select one or more of the policies for one or more enforcement points based on the correlations; and
   indicate selected ones of the one or more policies for the wireless device to the one or more enforcement points.

17. The computing apparatus of claim 16, wherein the multiple policy sources comprise Policy Decision Points (PDPs), wherein the one or more enforcement points comprise Policy Enforcement Points (PEPs), and wherein the layers of the interconnect model comprise layers of the Open Systems Interconnection (OSI) protocol.

18. The computing apparatus of claim 16, wherein to select the one or more policies for the one or more enforcement points based on the correlations, the program instructions direct the one or more processors to select the one or more policies that are for a control-plane for the wireless device and that are from a particular type of policy source of the multiple policy sources.

19. The computing apparatus of claim 16, wherein to select the one or more policies for the one or more enforcement points based on the correlations, the program instructions direct the one or more processors to select the one or more policies based on levels of traffic granularity of the one or more policies for the wireless device.

20. The computing apparatus of claim 16, wherein to select the one or more policies for the one or more enforcement points based on the correlations, the program instructions direct the one or more processors to select the one or more policies based on the subscription characteristics of the wireless device.

\* \* \* \* \*